United States Patent [19]

Nonnenmacher

[11] 3,978,668
[45] Sept. 7, 1976

[54] HYDRAULIC TRANSMISSION WITH INPUT-OUTPUT SPEED RATIO REGULATION

[75] Inventor: Gerhard Nonnenmacher, Korntal, Germany

[73] Assignee: Robert Bosch G.m.b.H., Stuttgart, Germany

[22] Filed: Oct. 10, 1972

[21] Appl. No.: 621,633

[30] Foreign Application Priority Data

Oct. 29, 1974 Germany............................ 2451293

[52] U.S. Cl................................... 60/447; 60/448
[51] Int. Cl.².......................................... F16H 39/46
[58] Field of Search............. 60/384, 447, 448, 449, 60/487; 404/101

[56] References Cited
UNITED STATES PATENTS

| | | | |
|---|---|---|---|
| 2,291,011 | 7/1942 | Vickers | 60/447 |
| 3,866,420 | 2/1975 | Appel | 60/447 X |

Primary Examiner—Edgar W. Geoghegan
Attorney, Agent, or Firm—Michael J. Striker

[57] ABSTRACT

The transmission drives a dispensing apparatus at a speed varying in proportion to a command value furnished by a command device. The transmission includes a hydromotor driving the dispensing apparatus, a main pump driving the hydromotor, and a regulating arrangement for making the variations in the speed of the hydromotor proportional to the variations in the command value. The regulating arrangement includes first and second measuring pumps driven by the hydromotor and by the command device for generating control pressures respectively indicative of the hydromotor speed and the command value. The regulating arrangement further includes a hydraulic control device connected to receive the control pressures and operative for automatically varying the fluid output of the main pump in dependence upon the difference in the control pressures. First and second flow restrictors lead from the fluid outputs of the respective measuring pumps to an unpressurized space to partially relieve the control pressure generated by the respective measuring pumps and establish the ratio between the command value variations and the hydromotor speed variations.

16 Claims, 4 Drawing Figures

HYDRAULIC TRANSMISSION WITH INPUT-OUTPUT SPEED RATIO REGULATION

BACKGROUND OF THE INVENTION

The invention relates to hydraulic transmissions of the type in which the speed of operation of a dispensing apparatus driven by the transmission is made to vary in proportion to variations in a command value furnished by a command device.

More specifically, the invention relates to hydraulic transmissions of the type in which the speed of operation of a dispensing apparatus driven by the transmission is kept proportional to a command value, despite variations in the command value.

Still more specifically, the invention relates to dispensing apparatuses, for example salt spreaders, mounted on vehicles, wherein the transmission which drives the dispensing apparatus is caused to operate at a speed proportional to the vehicle speed, despite variations in the vehicle speed. In the case of salt spreaders, or the like, the maintenance of the relationship just mentioned is particularly important, because it ensures that the amount of salt spread per unit surface area of the roadway will remain substantially constant, irrespective of the speed of the salt-spreading vehicle.

One known transmission arrangement of this type makes use of a hydraulic pump driven by a wheel of the vehicle. The pump draws hydraulic fluid out of a tank and supplies such fluid, via a flow restrictor, to a constant-output pump. The constant-output pump, in turn, supplies driving fluid to hydraulically driven apparatuses mounted on the vehicle. With this arrangement, the constant-output pump is supplied with driving fluid at a volumetric rate proportional to the vehicle speed, by supplying fluid to the constant-output pump in dependence upon the rotary speed of the vehicle wheel and in dependence upon the flow-restricting action of the restrictor. This known arrangement is of relatively simple construction although unfortunately it has proved unreliable in actual use.

SUMMARY OF THE INVENTION

It is a general object of the invention to provide a hydrostatic transmission arrangement having input-output speed ratio regulation so designed as to be simple and inexpensive to build, and yet extremely reliable in its operation.

This object, and other objects which will become more understandable from the description, below, of preferred embodiments, can be met, according to one advantageous concept of the invention, by connecting measuring pumps to the hydromotor which drives the dispensing apparatus and to the command means which furnishes the command value. These measuring pumps are driven at rotational speeds proportional to the hydromotor speed and to the command value, and they accordingly generate respective control pressures indicative of the hydromotor speed and the control value. These control pressures are then employed to oppositely act upon a control valve for the control of the adjustable-output main pump. Use is also made of flow restrictors connected between the fluid outlets of the measuring pumps and an unpressurized space, to establish the proportionality ratio.

The advantage of this arrangement is that the proportionality between the command value (e.g., the rotary speed of a wheel of the vehicle on which the dispensing apparatus is mounted) and the speed of the hydromotor which drives the dispensing apparatus can be maintained over the whole range of speeds of the hydromotor and over the whole range of the command value.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
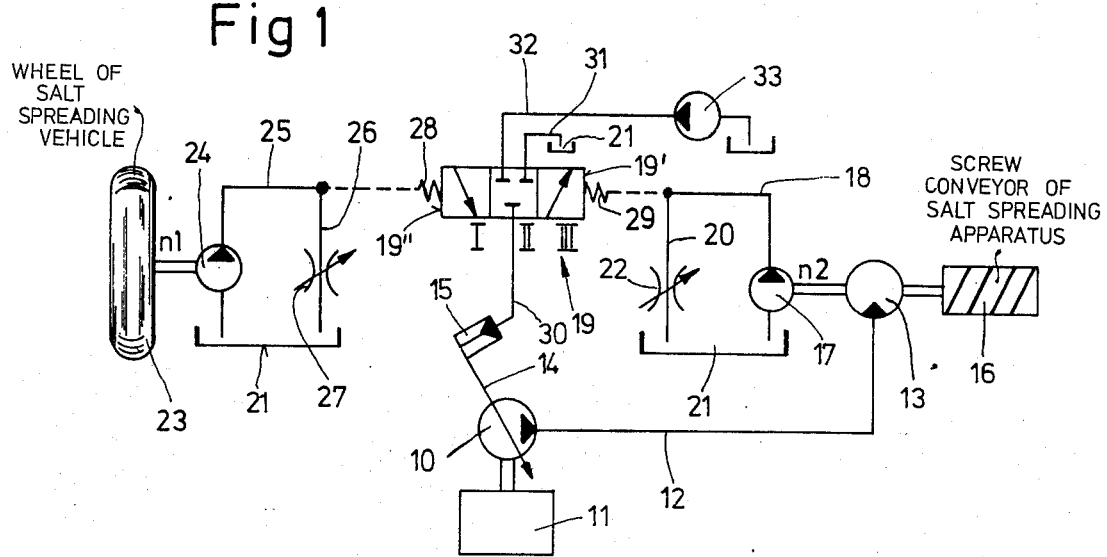
FIG. 1 illustrates schematically an hydraulic transmission provided with means for regulating the input-output speed ratio.

In FIG. 1, numeral 10 designates an adjustable output (e.g., adjustable stroke) pump driven by a machine 11, for example a diesel engine. The pump 10 supplies pressurized fluid via a conduit 12 to a non-adjustable-output (e.g., non-adjustable stroke) hydromotor 13. The pump 10 is provided with an adjusting member 14 which is actuated by an hydraulic adjusting device 15.

The output shaft of the hydromotor 13 turns at a rotary speed $n2$ and drives a worm screw 16 of a dosing arrangement, for example a salt spreader. The output shaft of hydromotor 13 additionally drives the rotor of a measuring pump 17. The fluid pumped out by measuring pump 17 is applied via conduit 18 to the right control port 19' of a three-way valve 19, and the pressure of this fluid constitutes a control pressure indicative of the rotary speed of hydromotor 13. Branching off from the conduit 18 is a further conduit 20 which leads to an unpressurized tank 21 and contains a flow restrictor 22, preferably an adjustable flow restrictor.

The wheel 23 of the vehicle on which the salt spreader 16 is mounted drives the rotor of a further measuring pump 24 with a rotary speed $n1$. The measuring pump 24 supplies pressurized fluid via a conduit 25 to the other control port 19'' of the control valve 19. Branching off from the conduit 25 is a further conduit 26 which likewise leads to the tank 21 and contains a flow restrictor 27, preferably an adjustable flow restrictor. The pressure of the fluid applied to control port 19'' constitutes a control pressure indicative of the command value for the transmission, in this case the rotary speed of the vehicle wheel. It will be understood that the control pressures applied to control ports 19', 19'' urge a valve member inside the control valve 19' in respective opposite directions. Also urging such valve member in opposite directions are two biasing springs 28, 29 which tend to maintain the valve member in its centered position.

A control pump 33 pumps fluid out of the tank and applies the fluid via a conduit 32 to the inlet port of the three-way control valve 19. Connected to the outlet port of valve 19 is a conduit 30 leading into the servo adjusting device 15. Control valve 19 is capable of assuming any of three different settings I, II and III. When valve 19 is in its middle setting II, the conduit 32 is blocked from the conduits 31 and 32. This is the neutral setting of valve 19.

It is the purpose of the regulating arrangement of the transmision to maintain the output rotary speed $n2$ of the hydromotor 13 proportional to a command value, in this embodiment the rotary speed $n1$ of the vehicle wheel. As already mentioned, the measuring pumps 24 and 17 are respectively driven by the vehicle wheel 23 and by the hydromotor 13. As a result of the operation of measuring pumps 17, 24 there are established at the flow restrictors 22, 27 pressures which rise and fall with the rate at which the measuring pumps 17, 24 pump fluid. As indicated before, the pressures generated by the measuring pumps 17, 24 are applied to opposite control ports 19', 19'' of control valve 19. If the control pressures in conduits 18, 25 differ from each other, the valve member of valve 19 is caused, against the action of one of the two springs 28, 29, to leave its neutral position. As a result, the speed of the screw conveyor 16 of the dispensing apparatus will be caused to increase or decrease for such a time until the new steady state is reached — i.e., until the control valve 19 again assumes setting II.

The details of the just-mentioned compensatory speed change are as follows: Let it be assumed that the valve 19 is in its neutral setting II and that the rotary speed of the vehicle wheel 23 increases. As a result, the measuring pump 24 will pump more fluid into conduit 25, causing a pressure rise upstream of the flow restrictor 27. This rise in the control pressure is communicated to control port 19'' and in opposition to compression spring 29 causes the control valve 19 to assume setting I. As a result, control pump 33 can pump fluid via conduits 32 and 30 into the servo adjusting device 15 causing the latter to set the pump 10 to a higher volumetric output. This causes the rotary speed of hydromotor 13 to increase, as a result of which the rotary speeds of the screw conveyor 16 and of the measuring pump 17 likewise rise. Now, the measuring pump 17 pumps more fluid than before into the conduit 18, as a result of which the pressure upstream of flow restrictor 22 increases. This control pressure increase continues until the valve member of control valve 19 is moved back into its middle setting II, whereupon the new steady-state condition is reached.

In contrast to the foregoing, let it be assumed that the rotary speed of wheel 23 drops. As a result, the pressure upstream of restrictor 27 drops, and the valve member of control valve 19, under the cooperative action of the compression spring 29 and the control pressure in conduit 18, causes valve 19 to assume setting III. When this occurs, fluid can flow out of hydraulic servo adjuster device 15 through conduits 30 and 32 into the unpressurized tank. This causes the pump 10 to be set to a lower volumetric output, as a result of which the rotary speeds of hydromotor 13, screw conveyor 16 and measuring pump 17 all drop. Consequently, the pressure upstream of flow restrictor 22 likewise sinks, whereupon the compression spring 28 and control pressure conduit 25 returns the valve member in valve 19 to the middle setting.

Because, in the steady state, the control pressures applied to the opposite sides of the control valve 19 are equal, it is possible to continuously vary the ratio between the rotary speeds of the wheel 23 and the screw conveyor 16 by changing the flow cross-sectional areas of the adjustable flow restrictors 22, 27.

Using conventional flow restrictors, the control pressure generated by each measuring pump 17, 24 changes as a quadratic function of the rotary speed of the measuring pump. Thus, if the ratio between two values of the vehicle speed is 1:10, the ratio between the corresponding two values of the control pressure will be 1:100. The resolution of such a regulating system will be poor at the low-speed end, because the change in control pressure for a given change in rotary speed is much greater in the high-speed region than in the low-speed region.

Figure 2:
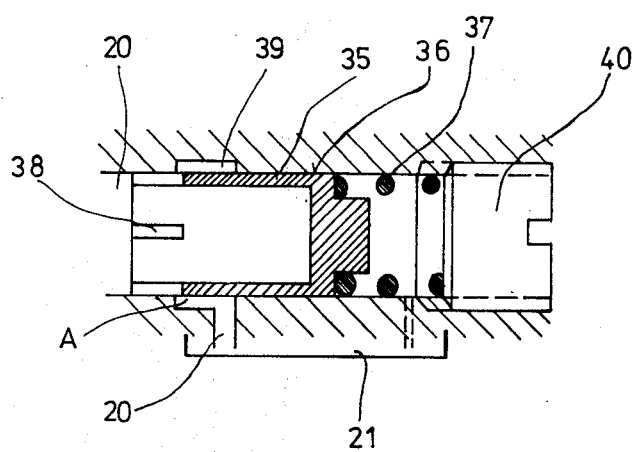
FIGS. 2–4 depict different versions of flow restrictors used in the hydraulic circuit of the transmission of FIG. 1.

Accordingly, instead of conventional adjustable flow restrictors 22, 27, the invention contemplates using pairs of spring-loaded flow restrictors so designed that each has a curve of pressure versus volumetrical flow rate which can be shaped as desired. FIG. 2 depicts a flow restrictor so designed that the flow cross-section of the flow restrictor varies linearly with the pressure drop across the flow restrictor; moreover, if the pre-compression of the spring is properly established, the relationship can be made not only linear but also directly proportional.

The flow restrictor of FIG. 2 includes a piston member 35 serving as a flow restrictor body. The piston member 35 is slidably but seal-tightly mounted in a bore-like section 36 of the conduit 20, which accordingly constitutes the flow restrictor housing. Fluid from the associated measuring pump enters from the left and presses the piston member 35 rightwards against the opposition of a compression spring 37. The piston member 35 is provided with a plurality of slit-shaped openings 38 each of which has a constant breadth, measured in direction perpendicular to the direction of sliding movement of the piston member 35. The wall of the flow restrictor housing is provided with an annular outlet 39 which communicates via the openings 38 with the interior of the piston member 35 to an extent dependent upon the distance by which member 35 has shifted. The openings 38 and the outlet 39 together form an outlet opening whose cross-sectional area increases linearly with piston displacement. The linear increase is attributable to the aforementioned constant breadths of the slit-like openings 38. Fluid entering the piston member 35 flows out through the openings 38 and outlet 39 of the flow restrictor housing 36 through the conduit 20 and into the tank 21. With this flow restrictor construction, the resolution of the regulating system will be best in the range of lowest volumetric flow rates. Moreover, the pressure relationship can be set within wide limits by suitably selecting the spring constant and/or the breadths of the slit-shaped openings 38.

With the flow restrictor of FIG. 2, in contrast to the simple flow restrictor of FIG. 1, it is not possible to arbitrarily set the effective flow cross-section of the restrictor. Only the spring pre-compression can be adjusted, although this adjustment can be performed very easily, for example using an adjustment screw 40 which abuts against one end of the spring 37. However, in the general case, a change of the spring pre-compression causes a change in the curve of pressure versus volumetric flow rate. With different settings of the flow restrictors 22, 27 of FIG. 1 the proportionality of $n2$ to $n1$ accordingly becomes lost.

Figure 3:
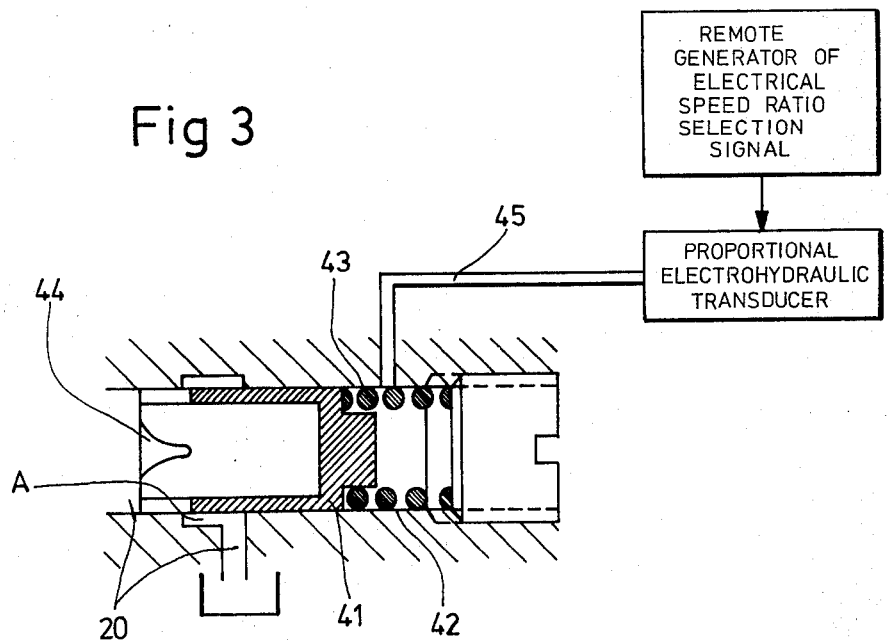
Figure 4:
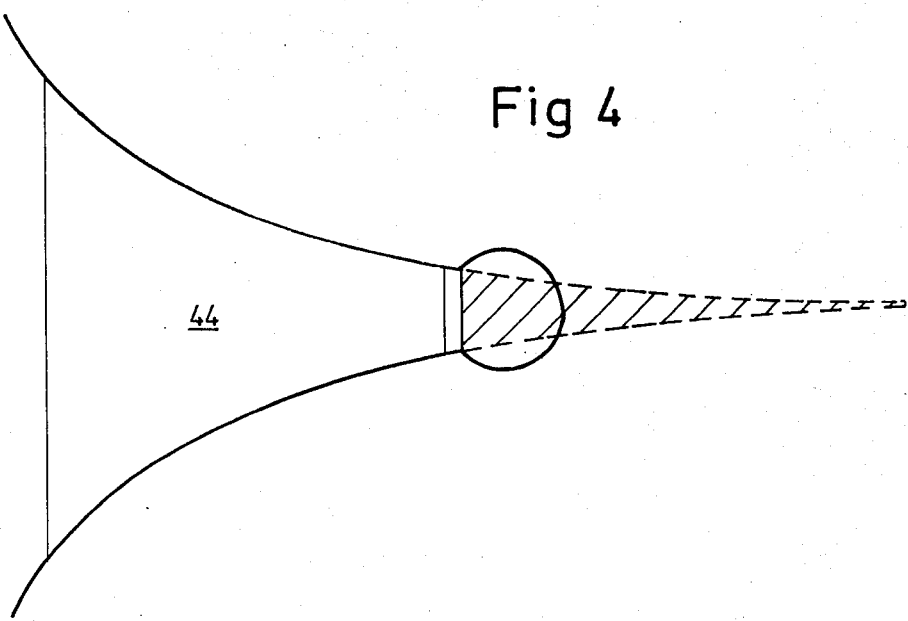

The invention therefore also contemplates a construction for the flow restrictor which avoids this difficulty. The openings defining the flow-restrictor flow cross-section are so configurated and dimensioned as to establish an exponential relationship between flow cross-section, on the one hand, and piston displacement (and accordingly flow restrictor pressure drop), on the other hand. Such a flow restrictor is depicted in FIGS. 3 and 4. It differs in construction from the flow restrictor of FIG. 1 exclusively in the configuration of its slit-like openings.

The flow restrictor includes a piston member 41 serving as the flow restrictor body. Piston member 41 is seal-tightly by slidably mounted in a flow restrictor housing 42 formed as part of the conduit 20. Fluid entering the piston member 41 displaces the piston member rightwards, in opposition to the compression spring 43. The piston member 41, at the end thereof remote from spring 43, is provided with a plurality of openings 44. These openings 44 are so configurated that their breadth, measured in direction transverse to the direction of piston movement, varies as an exponential function of their length, as measured in the direction of piston movement. The broader end of each slit 44 faces in the direction from which fluid applied to the flow restrictor comes.

With this configuration for the openings 44, it is possible to vary within wide limits the ratio between $n2$ and $n1$ by adjusting the pre-compression of spring 43, without losing the proportionality of the two rotary speeds. The resolution of the element is very high even at low rotary speeds of $n1$, corresponding to low vehicle speeds.

As an alternative to varying the precompression of the spring 43, or in addition thereto, the speed ratio can be changed by the remotely controlled application of a biasing pressure. For this purpose, the flow restrictor housing 42 is provided with a port and conduit 45 for the receipt of biasing fluid applied by remote control to change the speed ratio maintained by the regulating system. Such remote control of the speed ratio is particularly advantageous for salt spreaders and the like, because it permits the vehicle operator to conveniently change the speed ratio, in dependence upon street conditions, without requiring direct access to the flow restrictor elements. For using its remote control expedient, use can be made of a proportional electrohydraulic transducer which establishes to the right of the piston member 41 a biasing pressure proportional to a received electrical signal.

It will be understood that each of the elements described above, or two or more together, may also find a useful application in other types of hydraulic circuits and constructions differing from the types described above.

While the invention has been illustrated and described as embodied in the control of the speed of operation of a salt-spreading apparatus mounted on a vehicle in dependence upon the speed of the vehicle, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An hydraulic transmission arrangement for driving a dispensing apparatus at a speed varying in proportion to a command value furnished by a command means, comprising, in combination, a hydromotor for driving the dispensing apparatus; an adjustable-output main pump fluidly connected to the hydromotor for driving the same by supplying pressurized fluid thereto; regulating means for automatically varying the rotary speed of the hydromotor in proportion to variations in the command value furnished by the command means, including first and second measuring pumps connected to and driven by the hydromotor and the command means, respectively, for generating first and second control pressures respectively dependent upon the rotary speed of the hydromotor and the command value furnished by the command means, hydraulic control means connected to the fluid outputs of the measuring pumps and connected to the adjustable-output main pump for automatically adjusting the output of the main pump in dependence upon the difference between the first and second control pressures, and first and second flow restricting means each leading from the fluid output of a respective measuring pump to an unpressurized space for partially relieving the control pressure generated by the respective measuring pump.

2. The arrangement defined in claim 1, wherein the hydraulic control means includes a control valve having first and second control ports respectively connected to the fluid output of the first and second measuring pumps for receipt of the first and second control pressures, a valve member urged in respective opposite directions by the first and second control pressures, biasing spring means for urging the valve member to centered position, and adjusting means interconnecting the control valve and the adjustable-output main pump for increasing or decreasing the output of the main pump in dependence upon the direction in which the valve member moves out of the centered position.

3. The arrangement defined in claim 1, wherein at least one flow restricting means is an adjustable flow restrictor to make possible setting of the ratio between the variations in the command value furnished by the command means and the variations in the rotary speed of the hydromotor.

4. The arrangement defined in claim 1, wherein at least one flow restricting means comprises a spring-loaded flow restrictor having a flow cross-section varying in dependence upon the pressure of the fluid flowing through the flow restrictor.

5. The arrangement defined in claim 1, wherein at least one flow restricting means comprises means for automatically varying the flow cross-section of the flow restricting means in proportion to the pressure drop across the flow restricting means.

6. The arrangement defined in claim 1, wherein at least one flow restricting means comprises means for automatically varying the flow cross-section of the flow restricting means in exponential dependence upon variations in the pressure drop across the flow restricting means.

7. The arrangement defined in claim 1, wherein at least one flow restricting means is comprised of a flow restrictor housing having at least one outlet in its wall, a piston member slidable within the flow restrictor housing, and spring means urging the piston member in the direction opposite to the direction in which fluid enters the flow restrictor housing, the piston member being hollow and having in its wall at least one opening so configured and located that depending upon the extent to which the piston member is pushed back by entering fluid the opening and the outlet cooperate to a variable extent to form an outlet opening of variable cross-sectional area.

8. The arrangement defined in claim 7, wherein the outlet in the interior wall of the flow restrictor housing and the opening in the wall of the piston member are so configured and located that they cooperate to form an outlet opening whose cross-sectional area increases as a linear function of the displacement of the piston member.

9. The arrangement defined in claim 7, wherein the outlet in the interior wall of the flow restrictor housing and the opening in the wall of the piston member are so configured and located that they cooperate to form an outlet opening whose cross-sectional area increases as a greater than linear function of the displacement of the piston member.

10. The arrangement defined in claim 7, wherein each flow restrictor housing is furthermore provided with a remote control port for the remotely controlled inflow of biasing fluid to supplement the effect of the spring means and make possible remotely controlled adjustment of the flow cross-section of the flow restricting means.

11. The arrangement defined in claim 10, wherein the regulating means furthermore includes remote control means for remotely controlling the flow cross-section of the flow restricting means by remotely controlling the pressure of fluid admitted into the remote control port of the restrictor housing.

12. The arrangement defined in claim 11, wherein the remote control means comprises an electrohydraulic transducer operative for generating an hydraulic pressure proportional to a received electrical signal.

13. The arrangement defined in claim 1, wherein each flow restricting means furthermore includes means for preadjusting the biasing force exerted by the spring means.

14. The arrangement defined in claim 1, wherein the command means is a component of a vehicle which moves periodically at a speed dependent upon the speed of the vehicle, wherein the command value is the speed of the component, and wherein the dispensing apparatus is mounted on the vehicle.

15. The arrangement defined in claim 1, wherein the command means is a wheel of a vehicle, wherein the command value is the rotary speed of the wheel, and wherein the dispensing apparatus is mounted on the vehicle.

16. The arrangement defined in claim 2, wherein the adjusting means comprises a servo adjusting device connected to the control valve to receive pressurized fluid through the control valve and in dependence upon the receipt of such fluid effect adjustments of the output of the main pump.

* * * * *